United States Patent
Rakowski et al.

(10) Patent No.: US 10,678,858 B2
(45) Date of Patent: Jun. 9, 2020

(54) METHOD AND SYSTEM FOR GENERATING SEARCH SHORTCUTS AND INLINE AUTO-COMPLETE ENTRIES

(71) Applicant: Google LLC, Mountain View, CA (US)

(72) Inventors: Brian Rakowski, Palo Alto, CA (US); Glen Murphy, Palo Alto, CA (US); Ben Goodger, Los Altos Hills, CA (US); Peter Andrew Kasting, San Jose, CA (US); Arnaud Claude Weber, Saratoga, CA (US)

(73) Assignee: Google LLC, Mountain View, CA (US)

( * ) Notice: Subject to any disclaimer, the term of this patent is extended or adjusted under 35 U.S.C. 154(b) by 497 days.

(21) Appl. No.: 15/462,722

(22) Filed: Mar. 17, 2017

(65) Prior Publication Data
US 2017/0192993 A1   Jul. 6, 2017

Related U.S. Application Data

(63) Continuation of application No. 13/860,102, filed on Apr. 10, 2013, now Pat. No. 9,600,531, which is a
(Continued)

(51) Int. Cl.
| | |
|---|---|
| *G06F 16/00* | (2019.01) |
| *G06F 16/9032* | (2019.01) |
| *G06F 16/955* | (2019.01) |
| *G06F 16/33* | (2019.01) |
| *G06F 16/9535* | (2019.01) |
| *G06F 16/2457* | (2019.01) |

(Continued)

(52) U.S. Cl.
CPC ...... *G06F 16/90324* (2019.01); *G06F 3/0482* (2013.01); *G06F 16/24578* (2019.01); *G06F 16/3331* (2019.01); *G06F 16/951* (2019.01); *G06F 16/955* (2019.01); *G06F 16/9535* (2019.01); *G06F 16/9566* (2019.01)

(58) Field of Classification Search
CPC ............. G06F 16/90324; G06F 16/951; G06F 16/24578; G06F 16/9566; G06F 16/9535; G06F 16/955; G06F 16/3331; G06F 3/0482
See application file for complete search history.

(56) References Cited

U.S. PATENT DOCUMENTS

| | | | |
|---|---|---|---|
| 6,564,213 B1 | 5/2003 | Ortega et al. | |
| 7,543,244 B2 | 6/2009 | Matthews et al. | |

(Continued)

OTHER PUBLICATIONS

McCallum, "A Look at New Information Retrieval Protcols: SRU, OpenSearch/A9, CQL and XQuery," 72nd IFLA General Conference and Counsel, Seoul, Aug. 20-24, 2006, 8 pages.

*Primary Examiner* — Leslie Wong
(74) *Attorney, Agent, or Firm* — Shumaker & Sieffert, P.A.

(57) ABSTRACT

Embodiments for presenting search content is provided herein. An embodiment includes, receiving an input string in a browser input receiver, presenting a list of identifiers and search queries, wherein at least a portion of each of the identifiers and search queries match the input string, and presenting one or more search results associated with a selected search query on a display or providing a HTTP request to retrieve content associated with a selected identifier, and presenting the content on the display.

9 Claims, 10 Drawing Sheets

Related U.S. Application Data continuation of application No. 12/552,144, filed on Sep. 1, 2009, now Pat. No. 8,438,148.

(60) Provisional application No. 61/093,434, filed on Sep. 1, 2008.

(51) Int. Cl.
*G06F 16/951* (2019.01)
*G06F 3/0482* (2013.01)

(56) References Cited

U.S. PATENT DOCUMENTS

| | | | |
|---|---|---|---|
| 7,603,349 B1 | 10/2009 | Kraft et al. | |
| 7,698,327 B2* | 4/2010 | Kapur | G06F 16/951 |
| | | | 707/706 |
| 7,941,762 B1 | 5/2011 | Tovino et al. | |
| 8,131,731 B2 | 3/2012 | Vaughan et al. | |
| 8,271,546 B2 | 9/2012 | Gibbs | |
| 8,352,549 B2 | 1/2013 | Sacco et al. | |
| 8,438,148 B1 | 5/2013 | Rakowski et al. | |
| 2003/0069877 A1 | 4/2003 | Grefenstette et al. | |
| 2004/0039988 A1 | 2/2004 | Lee et al. | |
| 2005/0198068 A1 | 9/2005 | Mukherjee et al. | |
| 2005/0229154 A1 | 10/2005 | Hiew et al. | |
| 2006/0074980 A1 | 4/2006 | Sarkar | |
| 2006/0129541 A1 | 6/2006 | Morgan et al. | |
| 2006/0190441 A1 | 8/2006 | Gross et al. | |
| 2006/0224951 A1 | 10/2006 | Burke et al. | |
| 2007/0180510 A1 | 8/2007 | Long et al. | |
| 2007/0198643 A1* | 8/2007 | Cope | G06Q 10/107 |
| | | | 709/206 |
| 2007/0244868 A1 | 10/2007 | Grubb et al. | |
| 2007/0255702 A1 | 11/2007 | Orme | |
| 2007/0255754 A1 | 11/2007 | Gheel | |
| 2008/0034424 A1 | 2/2008 | Overcash | |
| 2008/0148193 A1 | 6/2008 | Moetteli | |
| 2008/0174570 A1 | 7/2008 | Jobs | |
| 2008/0177994 A1 | 7/2008 | Mayer | |
| 2008/0201235 A1 | 8/2008 | Almeida | |
| 2008/0235383 A1 | 9/2008 | Schneider | |
| 2008/0250012 A1 | 10/2008 | Hinckley et al. | |
| 2009/0006543 A1 | 1/2009 | Smit | |
| 2009/0046584 A1 | 2/2009 | Garcia et al. | |
| 2009/0070306 A1 | 3/2009 | Stroe et al. | |
| 2009/0106202 A1 | 4/2009 | Mizrahi | |
| 2009/0144234 A1* | 6/2009 | Sharif | G06F 16/90324 |
| 2009/0171930 A1* | 7/2009 | Vaughan | G06F 16/24578 |
| 2009/0222767 A1 | 9/2009 | Matthews et al. | |
| 2009/0327913 A1 | 12/2009 | Adar et al. | |
| 2010/0191619 A1 | 7/2010 | Dicker et al. | |

\* cited by examiner

United States Patent US 10,678,858 B2

METHOD AND SYSTEM FOR GENERATING SEARCH SHORTCUTS AND INLINE AUTO-COMPLETE ENTRIES

This patent application is a continuation of U.S. patent application Ser. No. 13/860,102, filed Apr. 10, 2013, now issued as U.S. Pat. No. 9,600,531, which is a continuation application of U.S. patent application Ser. No. 12/552,144, filed Sep. 1, 2009, now issued as U.S. Pat. No. 8,438,148, which claims the benefit of U.S. Provisional Patent Application No. 61/093,434, filed Sep. 1, 2008, the disclosures of which are incorporated herein by reference in their entireties.

BACKGROUND

Field

Embodiments of the present invention relate to network technology, and more particularly to web browsers.

Background Art

The growth of the Internet has resulted in a large number of content rich websites. When users navigate to a website or a content area, they perform various tasks within the content area. For instance, a user may choose to perform a task such as searching for content within a website. To assist users in searching for content, many websites have their own search engines which allow users to search for content within the websites or search for specialized types of information. For example, a website may provide a "search box" on its home page to allow users to search for content. In order to use a website's search box, users first navigate to the website and then search content using the search box. In addition to searching a website, users may perform other tasks. In many cases users perform a certain task or a certain combination of tasks during repeated visits to a website or content area.

For many users who frequently navigate to a certain website and perform the same task during recurring visits to the website, a multi-step process of first navigating to a website and then performing a certain task is time consuming and degrades a user's experience.

BRIEF SUMMARY

Embodiments of the present invention relate to generation of search shortcuts.

Search shortcuts, for example may allow a user to perform search of content in a content area prior to navigating to a content area where the search is to be performed.

An embodiment includes, detecting text input in a browser, determining if the text input corresponds to an identifier from where a search was previously initiated, and presenting one or more identifiers and an option to search content based on the determining step. Additionally, the embodiment includes receiving an input to select a option to search presented in the presenting step and generating a user interface to allow searching of content associated with a selected identifier based on the receiving step.

Another embodiment includes, categorizing one or more inputs entered into a browser input receiver, determining a plurality of relevance scores based on the categorizing step, ranking auto-complete entries based on the relevance scores, and presenting one or more of higher ranked auto-complete entries inline in the input receiver of the browser where the one or more inputs were received.

Another method embodiment includes, determining if a user attempted to navigate to an identifier or if the user provided a search query, presenting one or more search results based on the search query, providing a HTTP request concurrently with the presenting step to retrieve content associated with the identifier, and presenting a user interaction area to determine if the user intended to navigate to the identifier.

In this way, users may be able to search for content within a content area prior to navigating to the content area. Furthermore, work done by a user may be reduced as input text provided by a user may be automatically completed prior to inputting the entire text input.

Further embodiments, features, and advantages of the invention, as well as the structure and operation of the various embodiments of the invention are described in detail below with reference to accompanying drawings.

BRIEF DESCRIPTION OF THE DRAWINGS

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments relate to generating search shortcuts. An embodiment includes receiving text input in a browser, determining if the text input corresponds to an identifier from where a search was initiated and presenting one or more URLs based on the determining step and concurrently with the receiving step. Additionally, the embodiment includes receiving an input to select one of the URLs presented in the presenting step and generating a user interface to allow searching of content associated with a selected URL. Another embodiment includes, categorizing one or more inputs entered into a browser input receiver, determining a plurality of relevance scores based on the categorizing step, ranking auto-complete entries based on the relevance scores, and presenting one or more of higher ranked auto-complete entries inline in the input receiver of the browser where the one or more inputs were received. Another method embodiment includes, determining if a user attempted to navigate to an identifier or if the user provided a search query, presenting one or more search results based on the search query, providing a HTTP request concurrently with the presenting step to retrieve content associated with the identifier, and presenting a user interaction area to determine if the user intended to navigate to the identifier.

In this way, users may be able to search for content within a content area prior to navigating to the content area. Furthermore, work done by a user may be reduced as input text provided by a user may be automatically completed prior to inputting the entire text input.

While embodiments of the present invention are described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "identifier" used herein refers to a content address. An example of an identifier is a uniform resource locator (URL). URLs may address content stored across one or more networks, such as the Internet. In another example, an identifier may be a path and filename corresponding to a location of a locally store file. These examples are illustrative and are not intended to limit the definition.

This detailed description of the embodiments of the present invention is divided into several sections as shown by the following table of contents.

Figure 1:
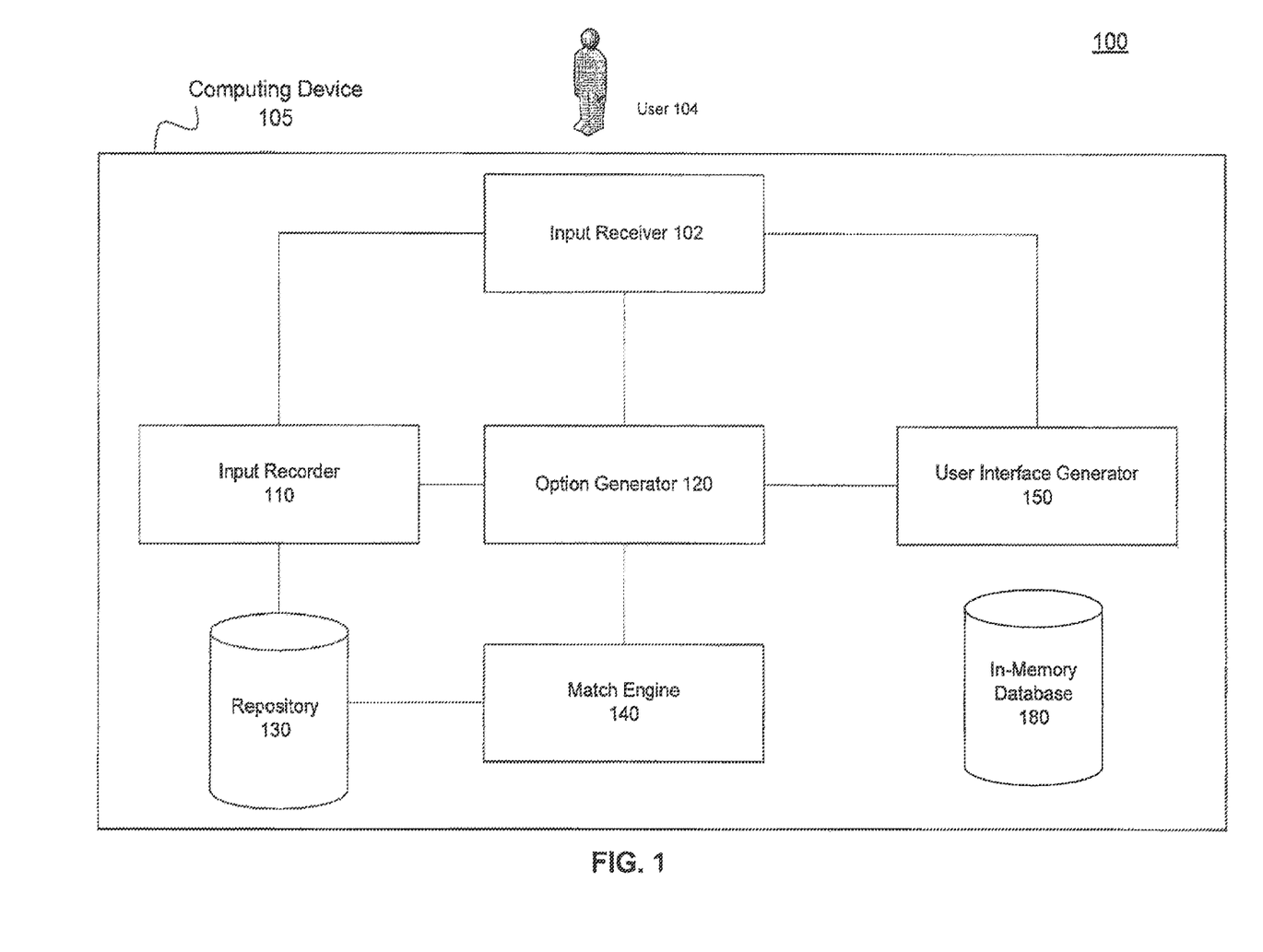
FIG. 1 is a diagram illustrating a system for generating search shortcuts, according to an embodiment.

Table of Contents
1. System
2. Receiving and Recording Identifiers
3. Determining Matches and Generating Options
4. Presenting Options
5. Selecting an Identifier from Options and Searching Content
6. Presenting Search Results
7. Inline Auto-Completion
8. Overall Ranking
9. Search Infobar
10. Exemplary User Interfaces 1. System This section describes a system for generating search shortcuts and inline auto-complete entries according to an embodiment illustrated in FIG. 1. FIG. 1 is a diagram of system 100 for generating search shortcuts and inline auto-complete entries. (While the following is described in terms of search shortcuts, the invention is not limited to this embodiment and any other task in place of a search related task may be used. Exemplary tasks may include completing a purchase, checking or composing an email and checking flight or travel information. The invention is applicable to any system having generally the structure of FIG. 1, or that would benefit from the operation, methods and functions as described herein.)

System 100 includes computing device 105. Computing device 105 can be any type of computing device having one or more processors. For example, computing device 105 can be a workstation, mobile device, computer, cluster of computers, set-top box, or other device having at least one processor. Such a computing device may include software, firmware, hardware, or a combination thereof Software may include one or more applications and an operating system. Hardware can include, but is not limited to, a processor, memory and graphical user interface display.

According to an embodiment, computing device 105 may include input receiver 102, input recorder 110, option generator 120, repository 130, match engine 140, user interface generator 150. Additionally, user 104 may communicate with input receiver 102.

Input receiver 102 may be any form of input system, capable of receiving a text input from a user. As an example, input receiver 102 may be an input text box in a browser that is capable of receiving an alphanumeric string. In an embodiment, input receiver 102 may be a uniform resource locator (URL) bar of a browser that receives content addresses. Input receiver 102 may receive an identifier from user 104. In another example, not intended to limit the invention, input receiver 102 may receive input in any form from user 104 and convert the received input into text. These examples are illustrative, and other input receiving mechanisms may be used.

Input recorder 110 may record identifiers received by input receiver 102 in repository 130. In an embodiment, input recorder 110 may record all identifiers that user 104 has requested to navigate. Input recorder 110 may also record metadata associated with the content of an identifier. Identifier content metadata is described further in the description.

Repository 130 may store identifiers received from input recorder 110. In an embodiment, repository 130 may store all the identifiers that user 104 has navigated over a period of time. As an example, if user 104 has navigated to the website "http://www.amazon.com," input recorder 110 may store the identifier "http://www.amazon.com" in repository 130. Labels, URL patterns, indexes or other ways of storing or managing identifiers and retrieval of identifiers can also be stored in repository 130. Repository 130 can be located at the same or a different location than computing device 105.

Repository 130 may be any form of database. For example, a database based on the SQLite library may be used. SQLite is popular database library known to those skilled in the art and is a form of a transactional SQL database engine.

In-memory database 180 may be used to store at least a subset of identifiers received by input receiver 102. As an example, not intended to limit the invention, in-memory database 180 can be instantiated within memory associated with computing device 105. Such memory may include a form of random access memory (RAM). In an embodiment, in-memory database 180 may have a smaller size and due to its in-memory nature, can be queried near-instantaneously.

Figure 2:
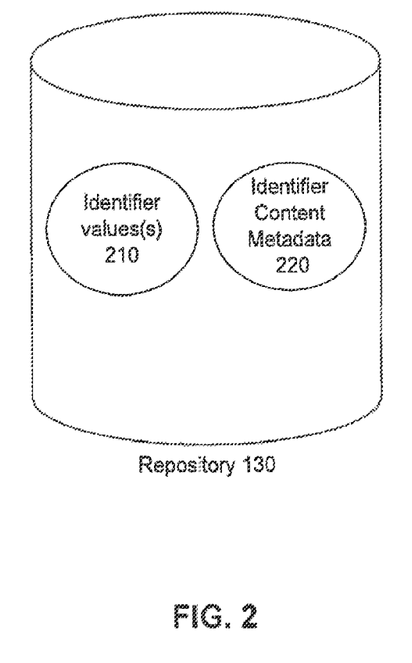
FIG. 2 is diagram illustrating a repository, according to an embodiment.

FIG. 2 shows a detailed diagram of repository 130. As shown in FIG. 2, repository 130 may further include identifier value(s) 210 and identifier content metadata 220. Identifier value(s) 210 may include all identifiers navigated by user 104. Identifier content metadata 220 may include any form of metadata associated with content of an identifier. As an example, not intended to limit the invention, identifier content metadata 220 may indicate if content associated with an identifier includes a search box or any other form of functionality that allows user 104 to perform a task. Identifier content metadata 220 may also include a counter to store a count of visits by a user to each identifier in identifier value(s) 210 and a flag to indicate if a particular content area is associated with a search box or any other search mechanism.

In an embodiment, not intended to limit the invention, identifier value(s) 210 and identifier content metadata 220 may be database tables and identifier value(s) 210 may point to identifier content metadata 220 or reference identifier content metadata 220. As an example, each identifier in identifier value(s) 210 may point to its respective content metadata in identifier content metadata 220. In this way, it may be possible to check if a particular identifier has a certain type of content metadata associated with it. For example it may be possible to check if the identifier "http://www.amazon.com" has a search box in its content.

As described earlier, identifier content metadata 220 may be populated by input recorder 110. In an embodiment, input recorder 110 may parse content associated with an identifier to determine if there is a search box or any other search functionality embedded within the content to populate identifier content metadata 220 with such information. As an example, input recorder 110 may check if there is an OpenSearch description document associated with content. The OpenSearch specification is known to those skilled in the art as a collection of formats for sharing search results. Additionally, search clients may use OpenSearch description documents to learn about the public interface of a search engine. These description documents may include identifier templates that indicate how the search client should make search requests. Search engines may also use OpenSearch elements to add search metadata to results in a variety of content formats.

Match engine 140 checks for matches between text that is being received by input receiver 102 and identifiers that are stored in identifier values 210. For example, match engine 140 may begin checking identifier value(s) 210 for matches as soon as user 104 inputs a first character in input receiver 102. As an example, consider that user 104 intends to navigate to "amazon.com" and begins typing "amazon.com" using input receiver 102. Match engine 140 may begin determining potential matches to identifier value(s) 210 as soon as a user types in "a" and may determine "amazon.com" to be potentially what user 104 intends to type by the time user 104 has completed entering the text "amaz". This example is illustrative and is not intended to limit the invention. In an embodiment, match engine 140 determines a plurality of matches and is not limited to one match.

Option generator 120 may receive input from match engine 140 and may provide a list of identifiers with their associated content metadata to user interface generator 150 as input. In an embodiment, option generator 120 receives all matches between input received by input receiver 102 and identifier value(s) 210 that have been determined by match engine 140. As an example, if input receiver 102 has received the text "amaz" from user 104, match engine may provide a list of identifiers that includes "amazon.com" to option generator 120. Option generator 120 may then provide the identifier "amazon.com" including any other identifiers to user interface generator 150 for presentation to user 104. In an embodiment, option generator 120 checks identifier content metadata 220 to determine if an identifier that has matched is associated with content that includes a search box. For example, if the identifier "amazon.com" is associated with a search box, option generator 120 provides this information to user interface generator 150. It is to be appreciated that in place of a search box, identifier content metadata 220 may point to other features or functionalities within the content of a website.

User interface generator 150 may receive input from option generator 120 and generate a user interface to allow interaction with the input. In an embodiment, user interface generator 150 may present a list of identifiers to user 104. Furthermore, user interface generator 150 may display an icon next to an identifier whose content includes a search box or any other such functionality. As an example, user interface generator 150 may display a list of identifiers adjacent to a URL bar of a browser. As a list of identifiers is displayed adjacent to a URL bar by user interface generator 150, user 104 may be able to see matching identifiers as soon as user 104 begins providing an input to input receiver 102. Exemplary user interfaces with respective screenshots are described further in the description.

2. Receiving and Recording Identifiers

As described above, input receiver 102 may receive an alphanumeric, text based input from user 104. If the input corresponds to an identifier, input recorder 110 may record the identifier in repository 130.

Figure 3:
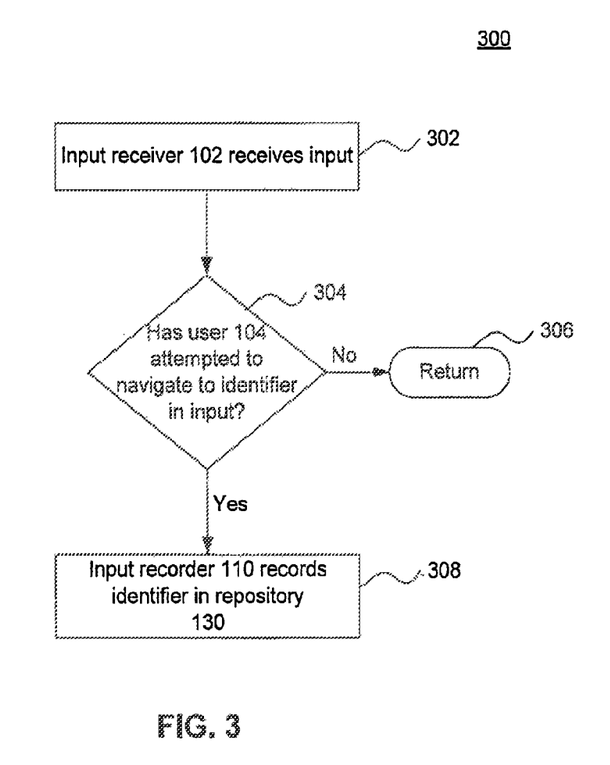
FIG. 3 is a flowchart illustrating receiving and recording of an input in a repository, according to an embodiment.

FIG. 3 is a flowchart illustrating an exemplary process of recording an identifier in repository 130, according to an embodiment of the invention.

Method 300 begins with input receiver 102 receiving an input (step 302). As an example, input receiver 102 may receive an input from user 104.

Input recorder 110 then checks if user 104 has attempted to navigate to the identifier in the input (step 304). For example, user 104 may attempt to navigate to an identifier by pressing the "Enter" key on a keyboard.

If the user has not attempted to navigate to the identifier in the input (step 304), method 300 returns (step 306). If the user has attempted to navigate to the identifier in the input (step 304), input recorder 110 records the identifier in identifier value(s) 210 in repository 130 (step 308). Additionally, input recorder 110 may also record metadata associated with the content of the identifier in identifier content metadata 220 in repository 130.

In this way, input receiver 102 receives an identifier and input recorder 110 records the identifier in repository 130. Over time, input recorder 110 may store a number of identifiers in repository 130.

3. Determining Matches and Generating Options

As described earlier, over time, input recorder 110 may store a number of identifiers in repository 130. At each attempt to navigate to using an identifier, match engine 140 may determine matches between an identifier that is being received by input receiver 102 and an identifier previously stored in repository 130. Option generator 120 may then present any snatches as options to user 104 using user interface generator 150.

Figure 4:
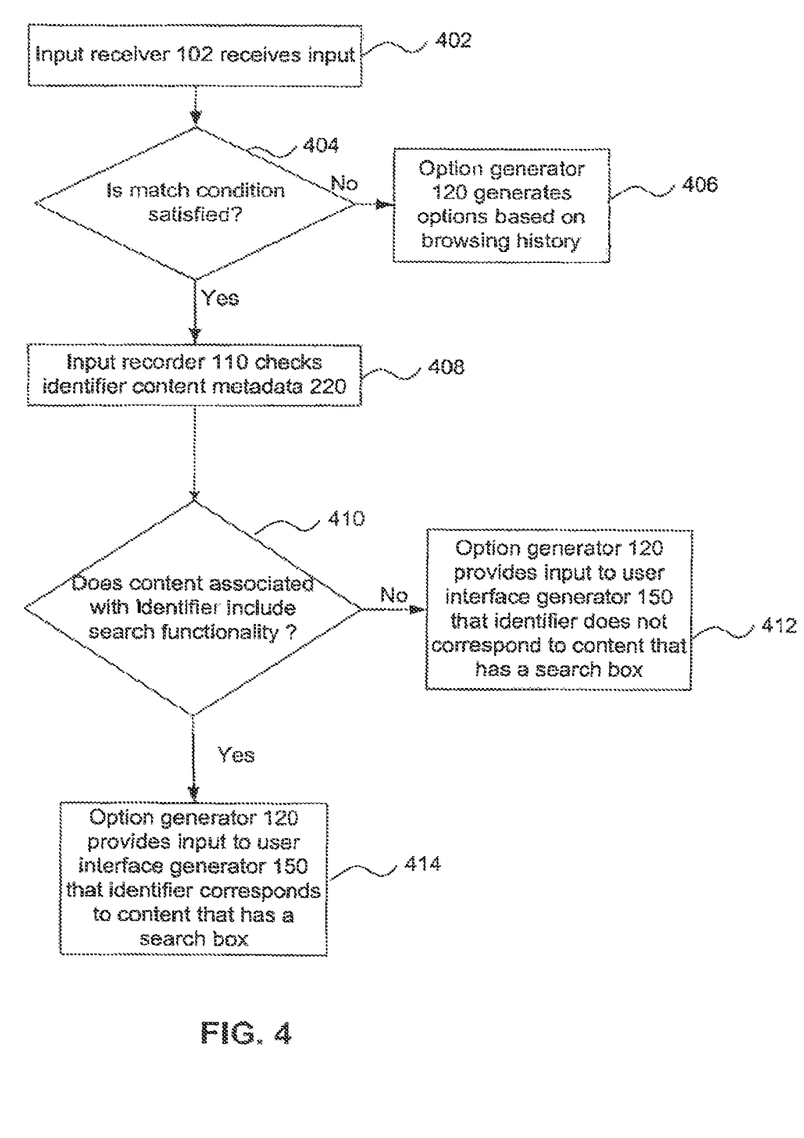
FIG. 4 is a flowchart illustrating the operation of a match engine, according to an embodiment.

FIG. 4 is a flowchart illustrating an exemplary operation of match engine 140 and option generator 120, according to an embodiment of the invention.

Method 400 begins with input receiver 102 receiving an input (step 402). As an example input receiver 102 may receive an identifier such as a URL from user 104.

Match engine 140 then checks if a match condition is satisfied (step 404). As an example, a match condition may be satisfied when an identifier received by input receiver 102 is present in identifier values 210, or when an identifier exactly matches an identifier in identifier values 210, or even when an identifier matches at least a portion of an identifier in identifier values 210. In an example where an identifier is a URL, a portion of the URL may match the URL name or a prefix (e.g. www.) associated with a URL stored in identifier values 210. These examples are illustrative and other methods of determining a match between an identifier received by input receiver 102 and identifier values 210 may be used.

If a match condition is not satisfied (step 404), option generator 120 may generate options based on browsing history of user 104 (step 406). As an example, browsing history may include content areas visited by user 104 in the past. Options, for example, may include one or more identifiers. Presenting of options is described further below.

If a match condition is satisfied (step 404), input recorder 110 checks identifier content metadata 220 (step 408). As an example, input recorder 110 checks identifier content metadata 220 to determine if user 104 has attempted to search content associated with the identifier in the past or if there is a search box or any other search functionality embedded within the content.

If user 104 has not attempted to search content associated with the identifier in the past or if there is no search box or any other search functionality embedded within the content (step 410), option generator 120 provides an input to user interface generator 150 that indicates that the content may not be searchable using a search box (step 412).

If user 104 has attempted to search content associated with the identifier in the past or if there is a search box or any other search functionality embedded within the content (step 410), option generator 120 provides an input to user interface generator 150 that indicates that the content may be searchable (step 414).

In this way, matches between an identifier received by input receiver 102 and identifiers stored in repository 130 may be determined by match engine 140. Additionally, option generator 120 may provide an input to user interface generator 150 that an identifier corresponds to searchable content. The operation of user interface generator 150 is described further below with respect to FIG. 5-6.

4. Presenting Options

Figure 5:
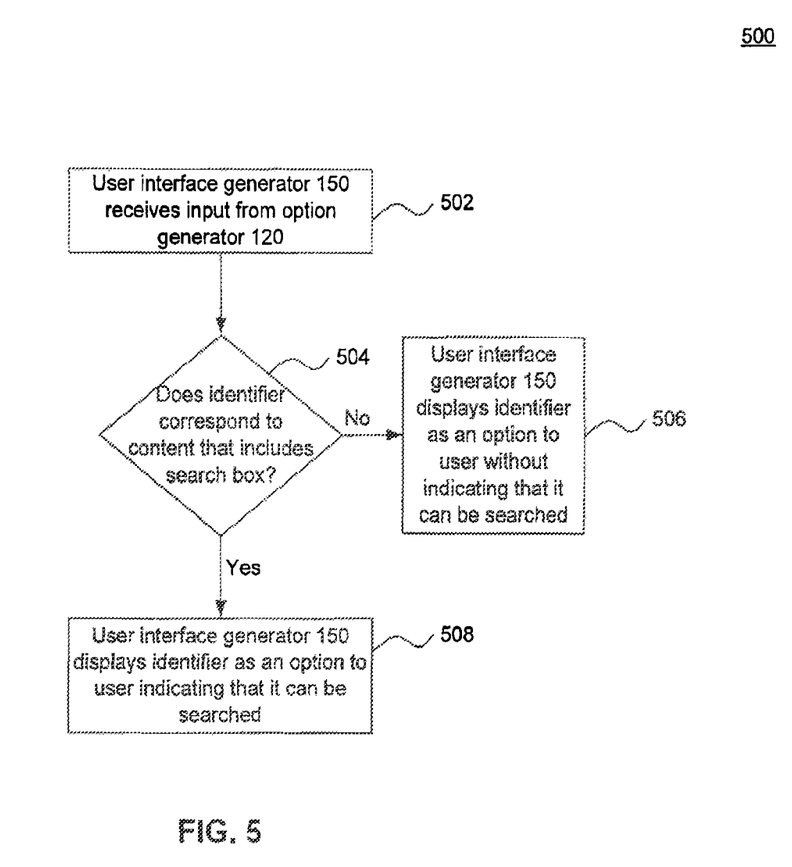
FIG. 5 is a flowchart illustrating the operation of a user interface generator, according to an embodiment.

As described above, user interface generator 150 receives an input from option generator 120 which may include one or more identifiers with information if a particular identifier is associated with content that includes search functionality. User interface generator 150 may then generate a user interface based on input from option generator 120.

FIG. 5 is a flowchart illustrating the operation of user interface generator 150, according to an embodiment of the invention.

Method 500 begins with user interface generator 150 receiving an input from option generator 120 (step 502). As an example, user interface generator 150 receives an input from option generator 120 which may include one or more identifiers with information if a particular identifier is associated with content that includes search functionality.

User interface generator 150 may then check if the input received from option generator 120 includes an identifier that is associated with a search box or any other search mechanism (step 504).

If the input received from option generator 120 includes an identifier that is associated with a search box or any other search mechanism (step 504), user interface generator 150 presents the identifier with an option to user 104 indicating that the content can be searched (step 506). As an example, user interface generator 150 may display an icon next to an identifier indicating that content associated with the identifier can be searched. Furthermore, user interface generator 150 may display the identifier adjacent to a URL bar in a browser to allow user to quickly select an identifier of interest without disrupting workflow.

If the input received from option generator 120 does not include an identifier that is associated with a search box or any other search mechanism (step 504), user interface generator 150 presents the identifier without an option to user 104 indicating that the content can be searched (step 508).

In this way, user interface generator 150 generates a user interface using input from option generator 120. As user interface generator 150 may display an icon next to an identifier to indicate searchable content, user 104 may be able to identify content that can be searched prior to navigating to the content to perform a search.

5. Selecting an Identifier from Options and Searching Content

Figure 6:
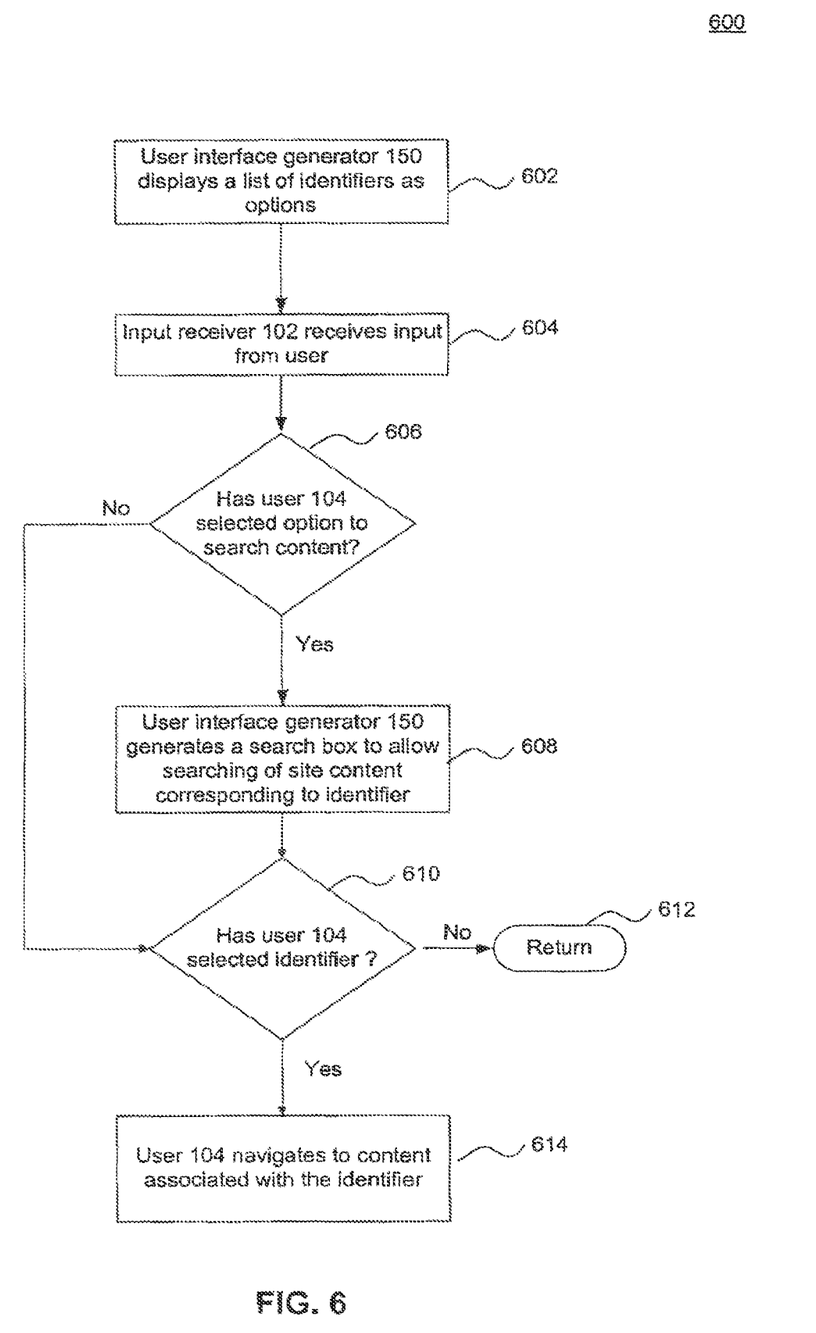
FIG. 6 is a flowchart illustrating the generation of a search box, according to an embodiment.

As described above, user interface generator 150 generates a user interface based on an input from option generator 120. As an example, such a user interface may include identifiers presented as a list adjacent to a URL bar in a browser. Furthermore, user interface generator 150 may indicate (using an icon) that an identifier in the list is associated with content that has search functionality.

FIG. 6 is a flowchart illustrating a process of selecting an identifier from a list of identifiers presented by user interface generator 150.

Method 600 begins with user interface generator 150 displaying a list of identifiers as options to user 104 (step 602). As an example, such a user interface may include identifiers presented as a list adjacent to a URL bar in a browser or input receiver 102.

Input receiver 102 then receives an input from user 104 (step 604). As an example, user 104 may select an identifier from the options presented in step 602. In another example, user 104 may select an option to search content associated with an identifier.

Input receiver 102 then checks if user 104 has selected an option to search content associated with an identifier (step 606).

If user 104 has selected an option to search content associated with an identifier (step 606), user 104 is presented with an option to search the content associated with the identifier (step 608). As an example, user interface generator 150 may generate a search box user interface to allow user 104 to search content within a website. As an example, if user 104 selects an option to search "http://www.amazon.com", user 104 will be provided with an option to search Amazon.com before user 104 navigates to Amazon.com.

If user 104 has not selected an option to search content associated with an identifier (step 606), input receiver 102 checks if user 104 has selected an identifier (step 610).

If user 104 has not selected an identifier (step 610), method 600 returns (step 612).

If user 104 has selected an identifier (step 610), system 100 allows user 104 to navigate to content represented by the identifier (step 614). As an example, if user 104 selects "http://www.amazon.com" user 104 will navigate to Amazon's website.

In this way, users may be able to search for content within a website prior to navigating to the website or webpage. For example, a user may search for content associated with "http://www.amazon.com" prior to navigating to "http://www.amazon.com". In another example, not intended to limit the invention, a user may be able to directly compose an email prior to searching for a contact. In still another example, not intended to limit the invention, a user may be able to check flight delays prior to navigating to a site that includes flight information. Thus, a multi-step process of first navigating to a website and then performing a certain task is avoided. This may improve user experience as a user is able to perform task associated with a content area prior to navigating to the content area.

6. Presenting Search Results

Figure 7:
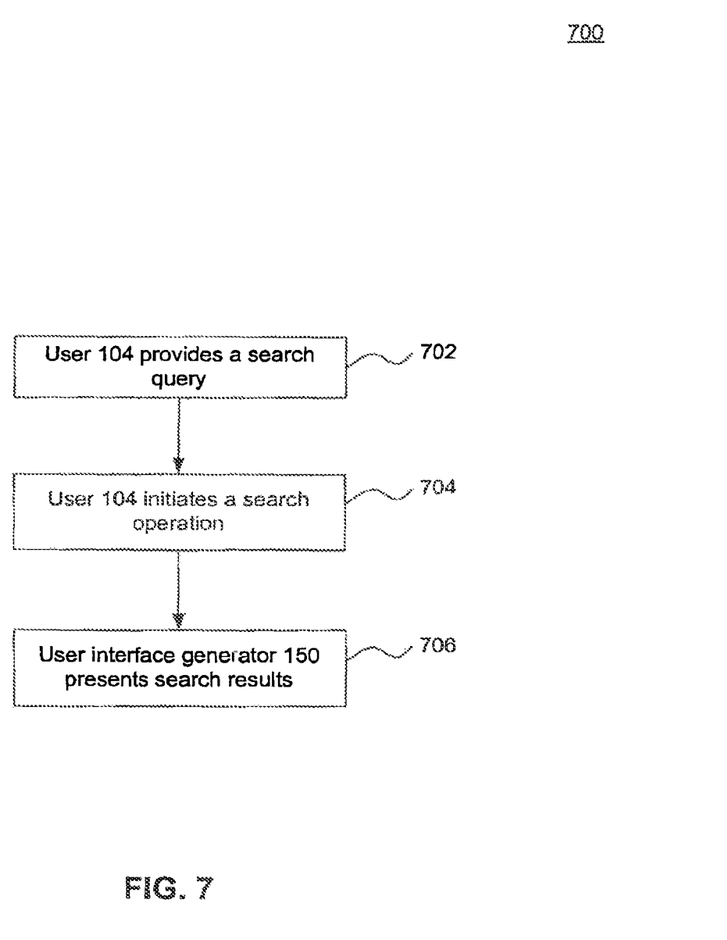
FIG. 7 is a flowchart illustrating searching of content by a user, according to an embodiment.

As described above, user interface generator 150 may generate a search box, after a user selects an option to search, to allow a user to search content prior to navigating to content represented by an identifier. User 104 may then type a query into the search box and initiate a search of the content. Once a search system associated with the content completes a search, search results are provided to user 104.

FIG. 7 is a flowchart illustrating the searching of content using a search box that has been generated by user interface generator 150.

Method 700 begins with user 104 providing a search query to a search box generated by user interface generator 150 (step 702).

User 104 may then initiate a search operation (step 704). As an example, user 104 may initiate a search operation using the "Enter" key on a keyboard. A search query may then be sent to a search engine (not shown) which returns search results.

User interface generator 150 may then present the search results to user 104 (step 706). In an embodiment, search results are presented to user 104 as a search results page associated with the content. As an example, if user 104 has initiated a search on "amazon.com", search results are presented to user 104 on a results page generated by "amazon.com". These search results from amazon.com are displayed within the results page generated by the Amazon.com website. In another embodiment, search results are displayed to user 104 in the form of a Google results page. In this case, these search results from amazon.com are then displayed in a results page generated by the Google.com website or in a Google results page format. It is to be appreciated that the form of presenting search results to user 104 is not limited to these embodiments and other presentation formats and methods may be used.

In this way, search results may be presented to user 104, according to embodiments of the invention.

7. Inline Auto-Completion

In an embodiment, input receiver 102 may auto-complete text that is being typed in by user 104 based on input from match engine 140. Input receiver 102, for example, may auto-complete a URL address or an identifier associated with a content area, prior to user 104 typing in the address or identifier completely.

When user 104 types in an input (e.g. a character) in the input receiver 102 (e.g. a URL bar of a browser), input receiver 102 may first determine whether to allow inline auto-completion. Once input receiver 102 determines to allow inline auto-completion, it may ask match engine 140 to return possible matches associated with user 104's input and pass along results of this determination so that input receiver 102 can provide auto-completed text to user 104 while user 104 is still in the process of typing in an input. As an example, matches determined by match engine 140 may include URL addresses or search queries that have been previously navigated to or executed by user 104.

In an embodiment, match engine 140 returns zero or more matches, which are inline auto-complete candidates, for each input provided by user 104. All of the matches which are inline auto-complete candidates may be assigned relevance scores by match engine 140. Relevance scores are used by match engine 140 to merge and sort the matches. If the highest ranking match based on at least the relevance scores has been marked as a candidate for inline auto-completion, input receiver 102 will then inline auto-complete user 104's input using the highest ranking match provided by match engine 140.

In another embodiment, input receiver 102 may disable inline auto-completion if user 104 has just deleted text from input receiver 102 or the user 104 has "pasted" into input receiver 102 contents that have been copied from another source.

In the former case where user 104 has just deleted text from input receiver 102, inline auto-completion is disabled by input receiver 102 because it may interfere with user 104's ability to continue deleting characters typed within input receiver 102. Furthermore, if the user 104 was trying to discard auto-completed text by deleting it, inline auto-complete may unnecessarily undo their action.

In the latter case where user 104 has "pasted" into input receiver 102 contents that have been copied from another source, inline auto-completion is disabled by input receiver 102 because user 104 is likely trying to navigate to a specific URL or search for a specific phrase, and if inline auto-completion were enabled by input receiver 102, it may incorrectly alter the URL or phrase that has been pasted by user 104 in input receiver 102.

According to the same embodiment, inline auto-completion may also be disabled by input receiver 102 if a cursor in input receiver 102 is not at the end of the text that has been typed into it. This is because, when user 104 is editing text at the middle or within their input, inline auto-completion no longer acts a typing accelerator and may instead be counter-intuitive. Additionally, inline auto-completion may be disabled by input receiver 102 if user 104 is using an input method editor (IME). An IME is a program that allows users to enter complex characters and symbols, such as Japanese characters, using a standard keyboard. Inline auto-completion may be disabled in this case as it may interfere with the IME and may again be counter-intuitive.

Thus, in the exemplary scenarios described above, input receiver 110 may selectively disable inline auto-completion of text typed by user 104 to preserve good user experience.

Match engine 140 may use repository 130 to store and track statistics including the number of times user 104 has visited a content area, the number of times user 104 has typed an identifier (e.g. URL) into input receiver 102, and the time of the last visit to a content area. When input receiver 102 receives an input string, match engine 140 attempts to match it against previously stored URLs or identifiers in repository 130, and pre-pends various common prefixes (e.g. "www.") so that user 104 does not have to explicitly type them into input receiver 102.

Match engine 140 then ranks the resulting matches, and marks all matches which have been typed a pre-determined number of times (e.g. one time for bare hostnames or two times for URLs with a non-empty path) as inline auto-complete candidates. If the top-most or the highest ranked match is such a candidate and has been typed a pre-determined number of times, match engine 140 gives the match a relevance score which may be sufficient to promote it as the best match from all matching URLs or identifiers stored in repository 130.

In an embodiment, in order for inline auto-completion to appear intuitive and be stable, inline auto-completion occurs synchronously while user 104 is typing into input receiver 102, and not on a delay that can cause the behavior of input strings to change based on how fast user 104 hits the "Enter" key to perform an action.

In some cases, repository 130 may take non-trivial time to query based on the type of database employed. Since all candidates for inline auto-completion must have been typed at least once, for example, to be stored in repository 130, a subset of identifiers user 104 has typed before may be also loaded into a in-memory database 180. In an embodiment, in-memory database 180 may have a smaller size and due to its in-memory nature, can he queried near-instantaneously. As an example, not intended to limit the invention, in-memory database 180 can be instantiated within memory associated with computing device 105. Such memory may include a form of random access memory (RAM).

In an embodiment, when the match engine 140 determines matches, it first performs the steps of ranking and marking identifiers using in-memory database 180, and returns only the highest ranked match, which may be sufficient to cover all cases where inline auto-completion is initiated by input receiver 102. Match engine 140 may then perform the steps described above, again, using the repository 130 which includes all identifiers navigated to by user 104 and returns a complete result set. In an embodiment, to make this effective, all matching algorithms used by match engine 140 produce the same "highest ranked" result when given either repository 130 or in-memory data sets. This prevents the results of inline auto-completion from changing between separate passes of repository 130 and in-memory database 180.

As an example, any ranking function within match engine 140 proceeds in an order calculated not only to provide good results from repository 130, but to provide the same "highest ranked" result for both the in-memory database and repository 130.

In general terms, the match engine 140 may determine that exact matches of user 104's input are better and need to be ranked highest, and failing that, identifiers which have been typed more often are better and ranked higher by match engine 140.

In an embodiment, if the highest ranked match is an identifier with a non-empty path, match engine 140 searches for shorter identifiers visited by user 104, of which the input string is still a prefix. If no such URLs are found, but the original best match can be trimmed to just a hostname and still match user 104's input, that match is used as the new highest ranked match.

In this way, users are not presented with auto-completed text that takes them to a longer URL on a site where they would have preferred a shorter one or just wanted to visit a site's front page even when the most common action they had been taking was to visit a page deeper on the site.

Figure 8:
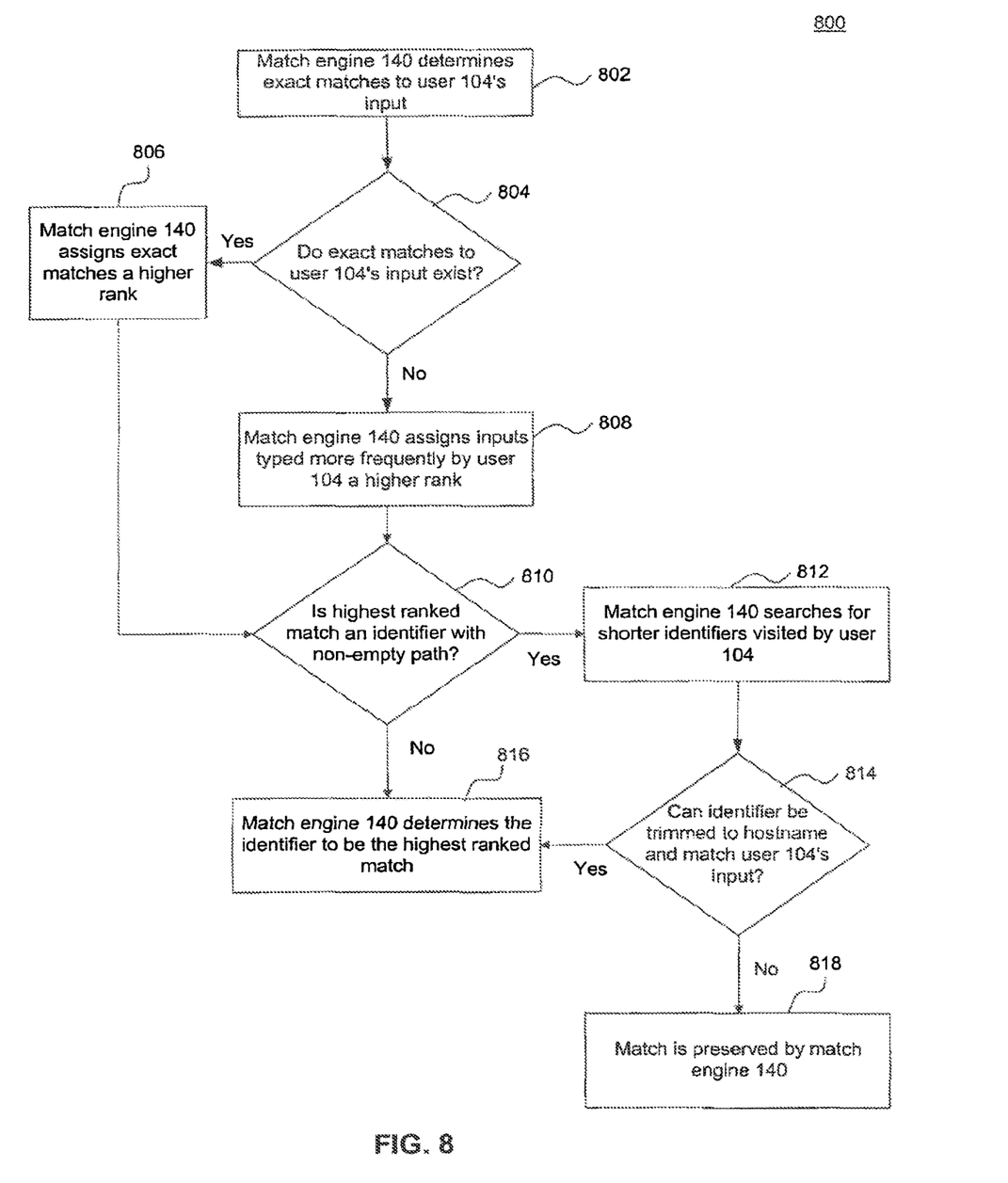
FIG. 8 is a flowchart illustrating an exemplary process of determining inline auto-complete candidates, according to an embodiment.

FIG. 8 is a diagram illustrating an exemplary process of determining inline auto-complete candidates, according to an embodiment of the invention.

Method 800 begins with match engine 140 determining if there are any exact matches to an input provided by user 104 to input receiver 102 (step 802).

If match engine 140 determines exact matches to the input provided by user 104 to input receiver 102 (step 804), match engine 104 may assign those exact matches a higher rank compared to other matches (step 806) and method 800 proceeds to step 810.

If match engine 140 does not determine exact matches to the input provided by user 104 to input receiver 102 (step 804), match engine 104 may assign inputs that have been typed more often by user 104 in input receiver 102 a higher rank as compared to other matches that may be determined and determines a highest ranked match (step 808).

Match engine 140 may then check if the highest ranked match is a URL or any identifier with a non-empty path (step 810).

If the highest ranked match is a URL or any identifier with a non-empty path (step 810), match engine 140 searches for shorter URLs the user has visited, of which the input string is still a prefix (step 812).

If the highest ranked match is a not a URL or any identifier with a non-empty path (step 810), match engine 140 may determine if the highest ranked match determined in step 808 can be trimmed to just a hostname and still match the user input (step 814).

If the highest ranked match determined in step 808 can be trimmed to just a hostname and still match user 104's input (step 814), that match may be determined to be the highest ranked match (step 816). If the highest ranked match determined in step 808 can not be trimmed to just a hostname and still match user 104's input (step 814), the match is preserved as-is by match engine 140 (step 818).

In this way, match engine 140 may determine determining inline auto-complete candidates and present the highest ranked candidates to user 104, according to an embodiment of the invention. The steps illustrated in method 800 are exemplary and are not intended to limit the invention. Furthermore, it is to be appreciated that the steps of method 800 may occur concurrently or in a different order to determine inline auto-complete candidates.

In an embodiment, when user 104 hits the "Enter" key to navigate to a URL typed in input receiver 102, the database statistics for that URL are updated by input recorder 110 in repository 130 to indicate that the URL has been both visited and typed. However, input recorder 110 may not update repository 130 if user 104 has just replaced the contents of input receiver 102 with "pasted" text. This is because, if the text is copied and pasted into input receiver 110 the contents have not been "typed" into input receiver 110. For example, user 104 may be probably pasting text in as a substitute for clicking a link to the page from another program, and may be less interested in typing it in again to revisit it. Thus, the text is scored as "visited" by match engine 140, in a manner similar to scoring a hyperlink click on web content.

Input recorder 110 may not update repository 130 if user 104 is attempting to reload or refresh a content area. In this scenario, user 104's attempt to reload or refresh the content area is also scored as "visited" by match engine 140.

Additionally, repository 130 may not be updated by input recorder 110 if user 104 is accepts an inline auto-complete match that does not look like a URL (e.g. the string "Search Google for airline prices"). In this exemplary scenario, match engine 140 does not score the underlying URL (e.g. "http://www.google.com/search?q= . . . " or similar) as having been "typed", since in this case user 104 did not see or type that explicit URL.

As a result of these changes, the typed counts for certain kinds of navigations stored in repository 130 by input recorder 110 are lower, and thus input receiver 102 may not initiate inline auto-completion for them.

8 Overall Ranking

In an embodiment, one or more match engine(s) 140 return matches in parallel, with assigned relevance scores. The results may then be merged into a sorted list by match engine 140. As an example, match engine 140 may select the six most relevant matches available at any time, as well as an optional seventh entry at the bottom of the list. This optional seventh entry, for example, may indicate when user 104 has additional non-shown matches stored in repository 130.

Match engine 140 may return more results continuously over an arbitrary period of time after user 104 types a key into input receiver 102. Furthermore, input receiver 102 may change the set of results visible at any instant if newer results come in with higher relevance scores than the older results generated by match engine 140.

Input from user 104 is first categorized by input recorder 110 as either being a URL, a search (for inputs which cannot possibly be URLs), or "unknown" (inputs like "food", which could reasonably be considered intranet URLs or search terms). In an embodiment, match engine 140 ranks the search-related matches for these inputs higher than the navigation matches. Search-related matches are matches associated with search queries and navigation matches are matches associated with URLs.

This categorization of whether an input is a URL, search query or "unknown" is sent to match engine 140 by input recorder 110 when requesting their matches. For example, categorization by input recorder 110 includes, distinguishing between e.g. "google.com" (a URL) and "google.co" (an "unknown", since "co" is the country code for Colombia, whose registrar does not allow this particular form of URL), or between "http://abc@google.com" (a HTTP authentication login) and "abc@google.com". In this case "abc@google.com" may be an email address, and so categorized as an "unknown" by input recorder 110 since user 104 may probably wish to search, but "abc@google.com" also could be an HTTP authentication login. These examples are illustrative and are not intended to limit the invention.

In an embodiment, match engine 140 may assign relevance scores to identifiers (e.g. URLs) based on an ordering of different types of results for each distinct kind of input received from user 104 (e.g. URL, search query or "unknown"), and then determines fixed relevance scores so that the actual results generated by match engine 140 are ranked based on the ordering of the results. In another embodiment, match engine 140 scores a match as a function of content of data received by input receiver 102 instead of simply assigning it a fixed score.

Embodiments allow match engine 140 to determine results synchronously with input received from user 104 while providing a consistent and stable ranking of results. Accordingly, the rankings of identifiers in the results generated by match engine 140 are chosen by match engine 140 such that all inputs from user 104 that can return any results will always return at least one result synchronously, and in a manner that one of the results is the highest-ranked match for that input.

In this way, for example, when user 104 hits the "Enter" key to execute a search or navigate to an identifier, auto-completed text may not change based on the time required to rank results. This improves overall user experience.

9. Search Infobar

As described earlier, inputs (e.g. URLs) provided by user 104 to input receiver 102 can be classified as "unknown" when user 104 navigates to them but is more likely to want to search content. On various corporate and educational intranets, this tradeoff turns out to be wrong for intranet URLs, which often take to form of a single word as a hostname. Thus, there is a need to determine if user 104 intends to search for a query or if user 104 intends to navigate to a content area. For example, if user 104 types in the term "shoes" in input receiver 102, input receiver 102 needs to determine if user 104 intends to search for the term "shoes" or navigate to a server associated with the name "shoes". Furthermore, users on intranets don't always know about or wish to navigate to all local addresses. As an example, just because a coworker sets up a machine named "shoes" does not mean a user would want to navigate to that server address.

In an embodiment, input receiver 102 detects cases where user 104 expected to navigate to a URL or identifier but received search results instead as the URL was treated as a search query. Even if the URL or identifier is treated as a search query, in parallel to presenting a search results page to user 104 based on user 104's input, a browser (such as a browser in computing device 105) sends a "HTTP HEAD" request to the relevant URL. The HTTP HEAD request may traverse through HTTP 301 and HTTP 302 re-direct responses. The HTTP 301 and HTTP 302 redirects are used to automatically redirect a web request.

When the request returns with a HTTP 2xx, HTTP 401, or HTTP 407 response code, input recorder 110 considers it to be a potential "accidental search" case and it is recorded in repository 130. As an example, HTTP 2xx, HTTP 401 and HTTP 407 response codes are associated with HTTP requests that return partial or no content.

The browser then determines whether the search result page is finished loading. If not, it waits until the search results page loads, and then user interface generator 150 displays a separate user interaction area or an "Infobar" asking if user 104 intended a navigate to a URL address. To detect such cases, input receiver 110 flags inputs where the user 104's text was classified as "unknown" and user 104 hit the "Enter" key without explicitly selecting an option for inline auto-complete candidates.

If user 104 confirms intent to navigate by providing an input to the Infobar, this is scored by input recorder 110 in repository 130 as having typed in a URL address in the first place and as a result, in the future this URL address may be inline auto-completed by input receiver 110.

In this way, input receiver 102 may be able to determine if user 104 intends to navigate to a content area or execute a search query. Such a determination allows input receiver 102 to inline auto-complete user 104's input in an intuitive manner. Furthermore, it is to be appreciated that inline auto-completion serves as a "shortcut" to complete a task as it allows auto-completion of a user's input prior to the user typing the input in its entirety. Additionally, for example, the Infobar may help to check if a user input has been correctly interpreted as either a URL or a search query.

10. Exemplary User Interfaces

Figure 9A:
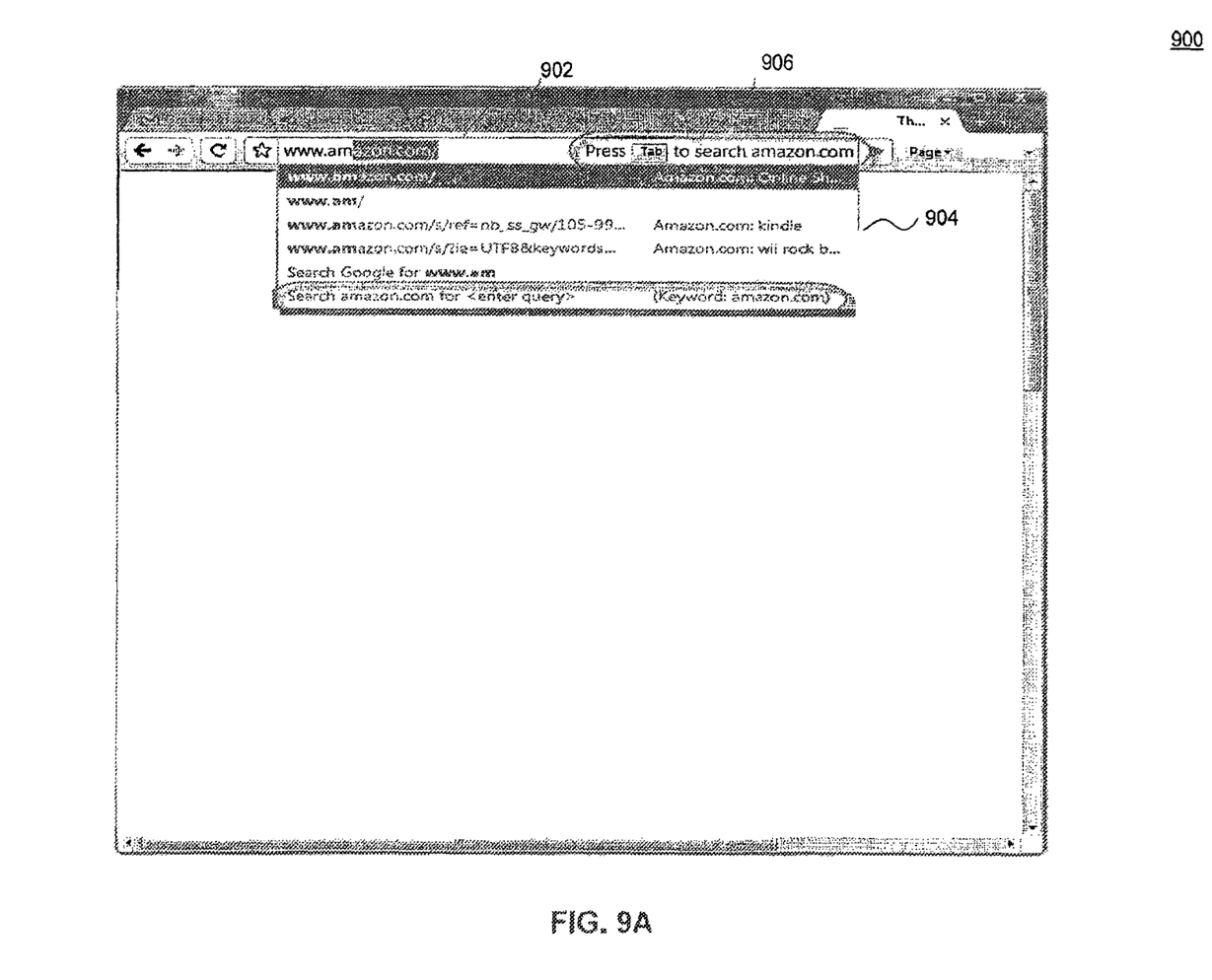
FIG. 9A and 9B are diagrams illustrating screenshots of an exemplary user interface interaction area of the system in FIG. 1
Figure 9B:
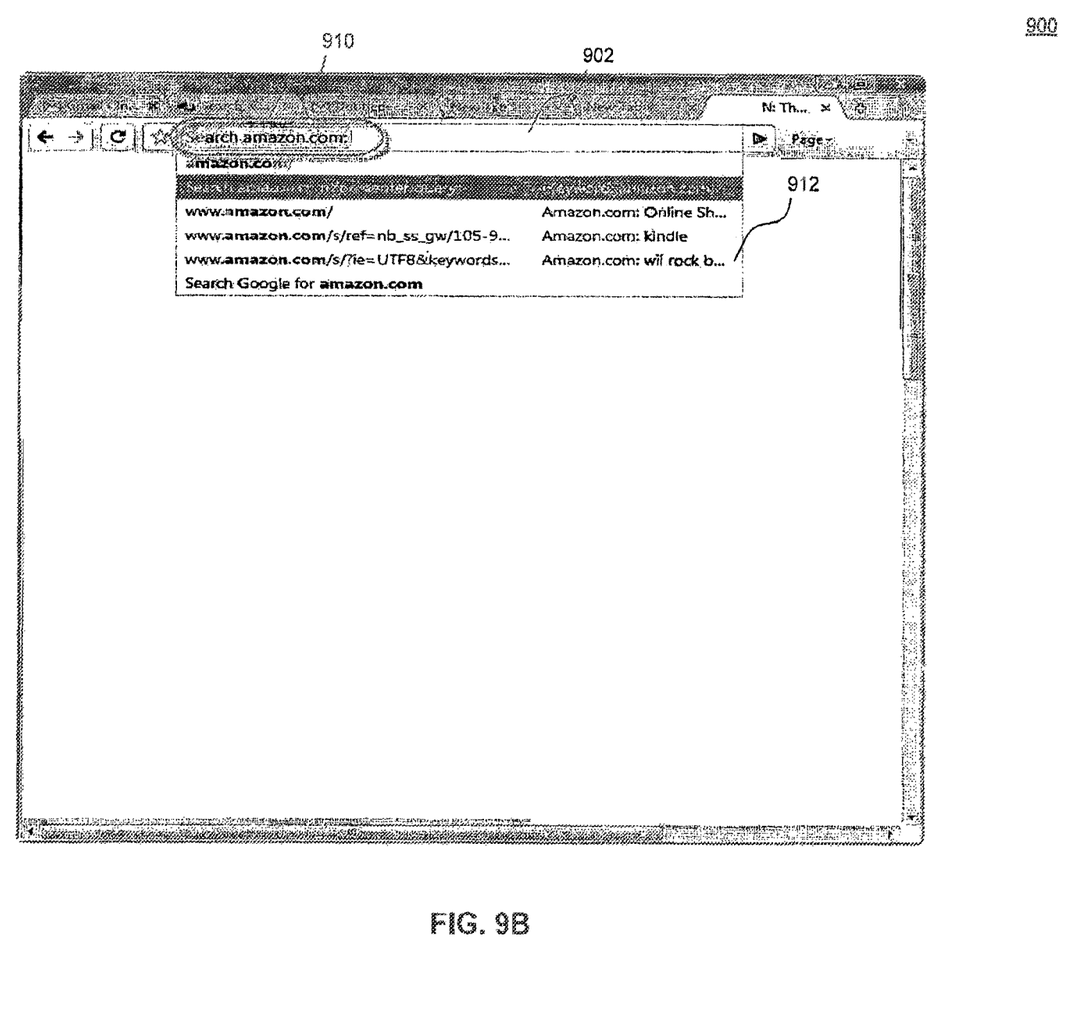

FIG. 9A and 9B are screenshots of exemplary user interfaces, according to embodiments of the invention.

FIG. 9A shows a screenshot of user interface 900 prior to initiation of a search by user 104. FIG. 9A shows URL bar 902, URL list 904 and option to search 906. In an embodiment, URL bar 902 receives an input from user 104. As an example, user 104 may type in an identifier into URL bar 902. URL list 904 may be generated by user interface generator 150 based on input from option generator 120. The exemplary URL list 90 shown in FIG. 9A may include different types of URLs. These URLs may be URLs that have been visited by user 104 previously. URL list 904 shows exemplary URLs "www.amazon.com", and other URLs such as "www.amazon.com/ . . . ", If user 104 selects the URL "www.amazon.com", user 104 may navigate to the Amazon.com homepage. If user 104 selects the other URL i.e. "www.amazon.com/ . . . ", user 104 may navigate to content deeper in the Amazon.com website, for example, a specific product page. Furthermore, the last entry of URL list 104 displays "Search Amazon for <enter query>". If user 104 selects this option, URL bar 902 may transform into a search bar that allows user 104 to directly search content within Amazon.com. User 104 may also initiate an option to search Amazon.com by pressing the "Tab" key as indicated by option to search 906.

FIG. 9B shows a screenshot of user interface 900, after user 104 has pressed the "Tab" key or accepted the option to search by selecting "Search Amazon.com for <enter query>" (as shown in FIG. 9A). As shown in FIG. 9B, URL bar 902 is now transformed into a search box user interface that allows user 104 to search "amazon.com" by entering a search query into search input area 910. If user 104 now provides a search query into the search input area 910 and initiates a search, the browser may display results to user 104 as an Amazon.com results page. The last entry in URL list 912 displays "Search Google for Amazon.com". Selecting this last input in URL list 912, allows user 104 to perform a Google search on Amazon.com. Such a search may return results to user 104 displayed as a Google results page.

In this way, a multi-step process of first navigating to a website and then performing a certain task, such as a search related task is avoided. This may improve user experience as a user is able to perform task associated with a content area prior to navigating to the content area.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
    receiving an identifier of a web site via an address bar of a browser;
    receiving an input associated with transforming the address bar of the browser into a search interface;
    responsive to receiving the input, transforming the address bar of the browser into the search interface for searching the web site, wherein transforming the address bar comprises providing for display a search identifier and at least a portion of the identifier of the web site in the address bar of the browser;
    receiving a query in the search interface prior to the browser displaying the web site; and
    retrieving and providing for display in the browser a web page of the web site that comprises search results corresponding to the query.

2. The method of claim 1, wherein the input comprises a selection of a tab key.

3. The method of claim 1, wherein the identifier of the web site comprises at least a portion of a uniform resource locator associated with the web site.

4. The method of claim 1, further comprising:
    receiving another identifier of another web site via the address bar of the browser;
    receiving the input associated with transforming the address bar of the browser into the search interface; and
    transforming the address bar of the browser into the search interface for searching the another web site responsive to receiving the input.

5. A device comprising:
    a processor configured to:
        receive an identifier of a web site via an address bar of a browser;
        receive an input associated with transforming the address bar of the browser into a search interface for searching the web site; and
        responsive to receipt of the input, transform the address bar of the browser into the search interface for searching the web site, wherein transforming the address bar comprises providing for display a search identifier and at least a portion of the identifier of the web site in the address bar of the browser;
        receive a query in the search interface prior to the browser displaying the web site; and
        retrieve and provide for display in the browser a web page of the web site that comprises search results corresponding to the query.

6. The device of claim 5, wherein the input comprises a selection of a tab key.

7. A computer program product comprising code stored in a non-transitory computer-readable storage medium, the code comprising:
    code to receive an identifier of a web site in an address bar of a browser;
    code to receive an input associated with performing a search of the web site via the address bar of the browser;
    code to, responsive to receipt of the input, transform the address bar into a search interface by providing a search identifier and the identifier of the website for display in a first portion of the address bar of the browser;
    code to receive a search query in a second portion of the address bar separated from the first portion of the address bar of the browser containing the search identifier and the identifier of the web site;
    code to initiate a search of the web site for the search query prior to the browser displaying the web site;
    code to receive, from the web site, a web page comprising at least one search result corresponding to the search query; and
    code to provide the web page for display in the browser.

8. The computer program product of claim 7, wherein the first portion of the address bar is separated from the second portion of the address bar by at least one space.

9. The computer program product of claim 7, wherein the input comprises a selection of a tab key.

* * * * *